United States Patent [19]

Anderrson et al.

[11] Patent Number: 4,908,071
[45] Date of Patent: Mar. 13, 1990

[54] METHOD OF MANUFACTURING TUBES OF ZIRCONIUM ALLOYS WITH IMPROVED CORROSION RESISTANCE FOR THERMAL NUCLEAR REACTORS

[75] Inventors: Erik T. Anderson; Sten A. Wilson, both of Sandviken, Sweden; John H. Schemel, Kennewick, Wash.

[73] Assignee: Santrade Limited, Lucerne, Switzerland

[21] Appl. No.: 226,517

[22] Filed: Jul. 29, 1988

Related U.S. Application Data

[63] Continuation of Ser. No. 838,690, Mar. 12, 1986, abandoned.

[30] Foreign Application Priority Data

Mar. 12, 1985 [SE] Sweden ................................ 8501216
Mar. 12, 1985 [SE] Sweden ................................ 8501217

[51] Int. Cl.⁴ .............................................. C22F 1/18
[52] U.S. Cl. .................................................. 148/11.5 F
[58] Field of Search ...................... 148/11.5 F, 133, 2

[56] References Cited

U.S. PATENT DOCUMENTS 3,645,800 2/1972 Mock et al. .................... 148/11.5 F
3,865,635 2/1975 Hofvenstam et al. .......... 148/11.5 F
3,963,534 6/1976 Frenkel et al. ...................... 148/133
4,450,020 5/1984 Vesterlund ..................... 148/11.5 F

FOREIGN PATENT DOCUMENTS 2509510 1/1983 France .

OTHER PUBLICATIONS

Mechanical Metallurgy by George E. Dieter, Jr., dated 1961, pp. 153–157.
Quality Costs of Zircaloy Cladding Tubes—Rose and Granlund, proceeding of the Int'l Conf organized by the British Nuclear Energy Soc. held Oct. 15-19, 1973.
Elements of Physical Metallurgy by Albert G. Guy, dated Apr. 1967, pp. 418–439.

Primary Examiner—R. Dean
Attorney, Agent, or Firm—Burns, Doane, Swecker & Mathis

[57] ABSTRACT

The invention relates to a method of making tubes of Zirconium alloys containing 1–5 percent by weight of alloying elements such as Sn, Fe, Cr and Ni. According to the invention an improved corrosion resistance can be reached by means of annealing after extrusion and between cold rollings within a well defined temperature range in the α-phase zone during considerably longer times than standardized for the purpose of reaching equilibrium between secondary phase particles and Zirconium matrix and in that way a minimum content of Fe in solid solution.

4 Claims, No Drawings

METHOD OF MANUFACTURING TUBES OF ZIRCONIUM ALLOYS WITH IMPROVED CORROSION RESISTANCE FOR THERMAL NUCLEAR REACTORS

This application is a continuation of application Serial No. 838,690 filed Mar. 12, 1986, abandoned.

The present invention relates to a method of making tubes of Zirconium alloys containing 1–5 % by weight of alloying elements such as Sn, Fe, Cr and Ni, and the rest essentially Zr, for the purpose of improving and corrosion resistance of the tubes in media such as water and steam at high pressure and high temperature. Among commercial alloys having a composition within the mentioned range there are the Zirconium alloys "Zircaloys" which are essentially used as cladding tubes in water cooled thermal boiling water and pressurized water nuclear reactors. The alloys, "Zircaloys" combine a small cross section for neutron absorption with excellent corrosion resistance and good mechanical properties. A typical composition of such alloys is, in percent by weight, 1–2 Sn, 0.05–0.25 Fe, 0.03–0.20 Cr, at the most 0.1 Ni and the rest essentially Zr.

The most frequently used Zircaloy alloys so far are Zircaloy-2 and Zircaloy-4. These alloys have the following composition:

| Element | Percentage by weight | |
|---|---|---|
|  | Zircaloy-2 | Zircaloy-4 |
| Sn | 1.2–1.7 | 1.2–1.7 |
| Fe | 0.07–0.20 | 0.18–0.24 |
| Cr | 0.05–0.15 | 0.07–0.13 |
| Ni | 0.03–0.08 | — |
| Zr | Rest | Rest |

So far, these two alloys have generally shown sufficient resistance to corrosion under the working conditions existent in a nuclear reactor. The development goes, however, towards greater utilization of the fuel which means longer working times of the fuel elements. Therefore the cladding material will be exposed to the corrosive water during a longer period of time than normal at the present, which means an increased risk of corrosion damages. The constructors of the fuel elements therefore wish increased corrosion properties of the used Zircaloy alloys retaining sufficient mechanical strength and ductility.

During the development of suitable cladding materials for thermal reactors studies were made of the influence of various alloying elements on the corrosion resistance of Zirconium in water and steam. These studies, which were performed several decades ago, resulted in two corrosion resistant alloys, Zircaloy-2 and Zircaloy-4. These alloys are today prescribed in all valid specifications for cladding tubes. The alloying with the elements Fe, Cr and Ni (only Zircaloy-2) results in precipitation of intermetallic phases containing also Zirconium besides said elements. The alloying element Sn dissolves in the matrix of Zr and contributes to an increase of the strength by a so-called solution hardening effect.

At the corrosion of Zircaloy in reactor environment two main types of corrosion mechanisms can be distinguished, namely general corrosion which is predominant in pressurized water reactors and so-called accelerated nodular corrosion which is predominant in boiling water reactors. It has been known for a long time that the corrosion resistance of cladding tubes of Zircaloy against so-called accelerated nodular corrosion in water and steam of high pressure and high temperature is markedly improved by a β-phase transformation, so-called β-quenching of the material at an early stage of the manufacturing. This β-quenching is performed according to valid specifications after forging of the ingot to bar. The same favourable effect is also obtained at β-quenching of the tube billet before the last cold rolling(s), see U.S. Pat. Nos. 3,865,635, 4,450,016 and 4,450,020, respectively. The exact reason for the improved resistance to accelerated nodular corrosion in water and steam of high pressure and high temperature has not yet been fully explained. It seem, however, as if the improvement of the corrosion resistance is related to the size to the intermetallic phases and their dispersion in the material. These phases, so-called secondary phases, are present in the form of particles. In conventionally manufactured tubes, i.e. tubes made with a β-quenching at the bar stage, the size of said particles lies in the interval 0.1–0.6 μm and with a mean particle size of about 0.3 μm.

In tubes, which in addition are manufactured with a β-quenching of the tube billet before the cold rolling(s), on the other hand, a considerable decrease of the size of the secondary phase particle is obtained. The refined particle size contributes to the desired improvement of the resistance to nodular corrosion.

While the connections between the structure of the Zircaloy tubes and the resistance to nodular corrosion are relatively well known and documented, the relations between manufacturing procedure, structure and resistance to general corrosion in pressurized water reactor environment are not at all just as well known. It has been found, however, that the standardized manufacture does not result in a cladding tube with optimum corrosion properties in pressurized water reactor environment, which means an increased risk for corrosion damages at a prolongation of the running time of the fuel. The alloying element in Zircaloy, which essentially seems to influence the corrosion resistance in PWR water environment, is Fe. As earlier indicated, Fe is bound in so-called secondary phase particles. In conventionally manufactured tubes, however, all the added iron is not present in these particles but a great share is also dissolved in the Zirconium matrix. In this connection, it seems as if Fe dissolved in the matrix is detrimental to the corrosion resistance. In accordance with the present invention it has now been found possible to reach a considerable decrease of the content of dissolved Fe in the Zirconium matrix and in that way an increased corrosion resistance of cladding tubes of Zircaloy by means of certain modifications of established manufacturing procedure. These modifications imply annealing after extrusion and/or annealing(s) between the cold rollings within a well defined temperature range in the α-phase zone during considerably longer times than standardized in order to obtain equilibrium between secondary phase particles and Zirconium matrix and in that way a minimum content of Fe in solid solution. More precisely, the modification according to the invention contributes to a decrease of the content of dissolved Fe in the Zirconium matrix according to the following:

Annealing after extrusion and between cold rollings.

In conventional manufacture there is performed annealing of extruded tubes and annealing between cold rollings in the α-phase range at 625°–790° C. for the purpose of recrystallizing the structure before the following cold rolling. The extruded product can be subjected to a series of cold rollings with an intermediate anneal at 625°–700° C. between two successive cold rollings to make possible the succeeding cold rolling paths. The cooling of the material after each intermediate anneal is carried out at a maximum rate of 3° C. per minute. At these annealings there is a growth of existing secondary phase particles and precipitation of new particles, at which the content of dissolved Fe in the Zirconium matrix gradually decreases. This precipitation process goes relatively slow within the used annealing interval. The total annealing time being used as standard is completely unsufficient for the process to reach equilibrium and for obtaining a minimum content of Fe dissolved in the matrix. By performing the annealings at such a combination of temperature and time which leads to essentially complete equilibrium, the share of secondary phase particles can be maximized and the content of Fe in solid solution in the Zirconium matrix can be minimized. The combination of temperature/time is defined by an annealing parameter A, according to the following:

$A = t \cdot e^{-Q/RT}$ where t = annealing time in hours
Q = the activating energy of the process in cal/mole
T = temperature in °K
R = general gas constant, cal/mole· degree.

By annealing tests the activating energy has been estimated to 65000 cal/mole. In order to reach equilibrium, A has to exceed a critical value $A_c$. This critical value is:

$A_c = 2.3 \cdot 10^{-14}$.

Within the actual annealing interval 625°–790° C. said value of $A_c$ means a shortest annealing time according to the following table, which gives examples for some annealing temperatures.

| Annealing temp. °C. | Shortest annealing time h |
| --- | --- |
| 790 | 0.5 |
| 725 | 3.9 |
| 675 | 22.2 |
| 650 | 56.5 |
| 625 | 151.3 |

According to a modification within the scope of the invention, there is performed a further annealing before the last rolling(s) within a well defined low temperature range in the α-phase zone in order to obtain the maximum volume fraction of secondary phase. By performing the annealings first at a combination of high temperature, more precisely between 650° and 790° C., and long time in the α-phase range which leads to equilibrium between the matrix and the secondary phase particles and then at a lower temperature, more precisely between 540° and 650° C. in the α-phase range, which gives an additional contribution of precipitated secondary phase, the share of secondary particles can be maximized and the content of Fe in solid solution in the Zirconium matrix be minimized. The time at the later low temperature annealing in the α-phase range shall exceed 2 hours in the mentioned temperature range of 540°–650° C.

From the following example it is clear that an improved corrosion resistance has been obtained in manufacturing according to the invention compared to conventional technique.

EXAMPLE

The corrosion resistance has been surveyed by autoclave testing in steam at a pressure of 10.3 MPa and a temperature of 400° C. Testing has been accomplished on samples taken out from conventionally manufactured tubes as well as from tubes made according to the invention. After a testing time of 1344 h the increase in weight was measured having the following result:

| Type of tube | Increase in weight mg/dm² |
| --- | --- |
| According to the invention | Less than 50 |
| According to the invention but with an additional annealing before the last cold rolling | Less than 48 |
| Conventionally manufactured | 52–59 |

As appears, the cladding tubes according to the invention have shown a smaller increase in weight than standard tubes, which means that the tubes according to the invention are expected to be more resistant to corrosion in reactor environment. The difference regarding the increase in weight may seem small. The testing time is only 1344 h, however, while normal working times in commercial pressurized water reactors are of the size of 4 years or longer time. An extrapolation of above data with knowledge of the kinetics of the oxide growth as function of time indicates, however, that the tubes according to the invention obtain a considerably better corrosion resistance compared to conventionally manufactured tubes.

I claim:

1. A method of making cladding tubes of a zirconium alloy containing 1–5 percent by weight of alloying elements including Sn, Fe, Cr and Ni and the rest essentially Zr, for the purpose of improving the corrosion resistance to general corrosion in media typical of water cooled thermal nuclear reactors at high pressure and high temperature, comprising annealing the material after extrusion and between cold rollings in the α-phase range at a temperature within the interval 625°–790° C., at a combination of temperature and time which essentially gives complete equilibrium between zirconium matrix and precipitated secondary phase particles at which the temperature/time is defined by an annealing parameter $$A = t \cdot e^{-\frac{6500}{RT}},$$

where t is the annealing time is hours, T is the absolute temperature, R is the general gas constant in cal mold · degree, which at equilibrium shall exceed a critical value $A_c = 2.3 \cdot 10^{-14}$, where said critical value means the following examples of shortest annealing times within the temperature interval 625°–790° C.,

| Annealing temperature (°C.) | Annealing time (h) |
| --- | --- |
| 790 | 0.5 |
| 725 | 3.9 |
| 675 | 22.2 |
| 650 | 56.5 |
| 625 | 151.3 | cooling the tubes at a maximum rate of 3° C./minute and thereby obtaining a maximum volume fraction of the secondary phase particles.

2. Method according to claim 1, including a further annealing before the last cold rolling at a temperature within the interval 540°–650° C. in order to obtain the maximum volume fraction of secondary phase and in that away a minimum content of Fe in solid solution in the Zirconium matrix.

3. Method according to claim 1, wherein the composition of the Zirconium alloy in percent by weight is 1–2 Sn, 0.005–0.25 Fe, 0.03 0.20 Cr, at the most 0.1 Ni and the rest principally Zr.

4. Method according to claim 2, wherein the composition of the Zirconium alloy in percent by weight is 1–2 Sn, 0.005–0.25 Fe, 0.03 0.20 Cr, at the most 0.1 Ni and the rest principally Zr.

* * * * *